United States Patent [19]

Axelbaum

[11] Patent Number: 4,792,223
[45] Date of Patent: Dec. 20, 1988

[54] OPTICAL DEVICE

[76] Inventor: Richard L. Axelbaum, 232 Third St., Davis, Calif. 95616

[21] Appl. No.: 125,171

[22] Filed: Nov. 25, 1987

[51] Int. Cl.$^4$ .......................... G02C 1/00; G02B 27/14
[52] U.S. Cl. ...................................... 351/158; 351/50; 350/174
[58] Field of Search ...................... 351/158, 50, 44, 47, 351/57; 350/171, 172, 174, 286, 601; 2/426, 432

[56] References Cited

U.S. PATENT DOCUMENTS

| | | | |
|---|---|---|---|
| 4,647,165 | 3/1987 | Lewis | 351/158 |
| 4,733,958 | 3/1988 | Gorsich | 351/158 |

*Primary Examiner*—Rodney B. Bovernick
*Assistant Examiner*—P. M. Dzierzynski
*Attorney, Agent, or Firm*—Larry D. Johnson

[57] ABSTRACT

An optical device provides a unitary, functional eyewear device that enables the viewer to simultaneously receive both primary (on-axis) and secondary (off-axis) images. The optical device includes a primary lens, of a shape and size to be mounted in a frame and worn as traditional eyewear. This primary lens has some inherent reflectivity, transmitting some portion of the light reaching it, and reflecting the remainder. A secondary image mirror portion is preferably mounted along one edge of the primary lens so as to capture at least some desired portion of the light reflected from the primary lens. This secondary image mirror acts more as a true (opaque) mirror, reflecting some significant portion of the light impinging upon it. By proper alignment of this secondry image mirror adjacent the primary lens, some of the light initially reflected by the primary lens is re-reflected back towards the primary lens, where a portion of such light will be transmitted through the primary lens to the viewer's eye. Thus, the viewer is able to perceive two images: the first on-axis (straight ahead) image initially transmitted through the primary lens, and the second off-axis (from above, below, or to the side of the viewer, depending upon the secondady image mirror location) image initially reflected by the primary lens, and then re-reflected by the secondary image mirror.

6 Claims, 2 Drawing Sheets

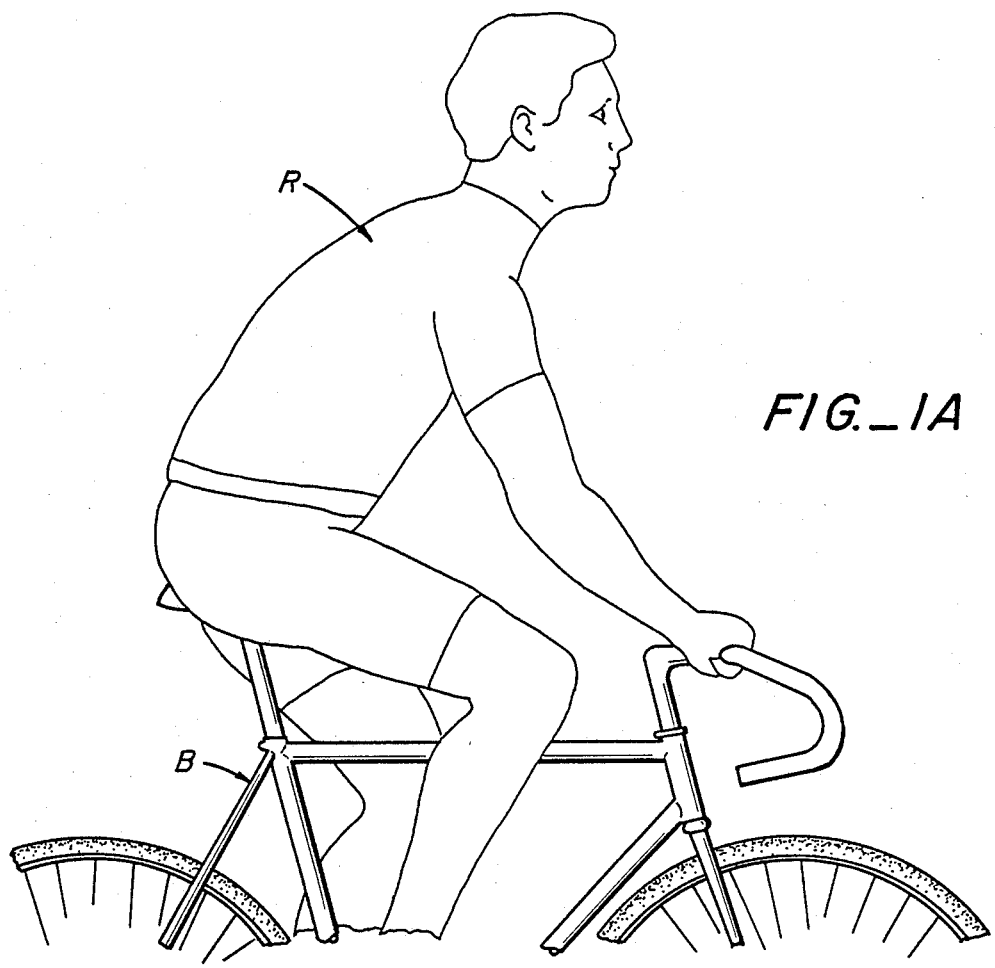
FIG._1A
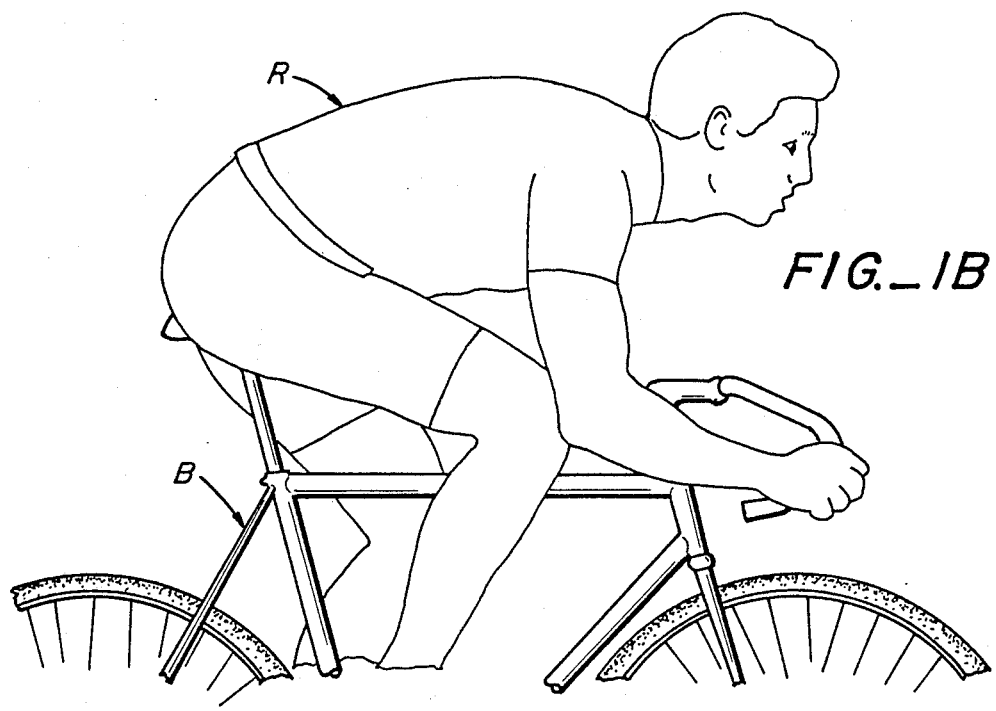
FIG._1B

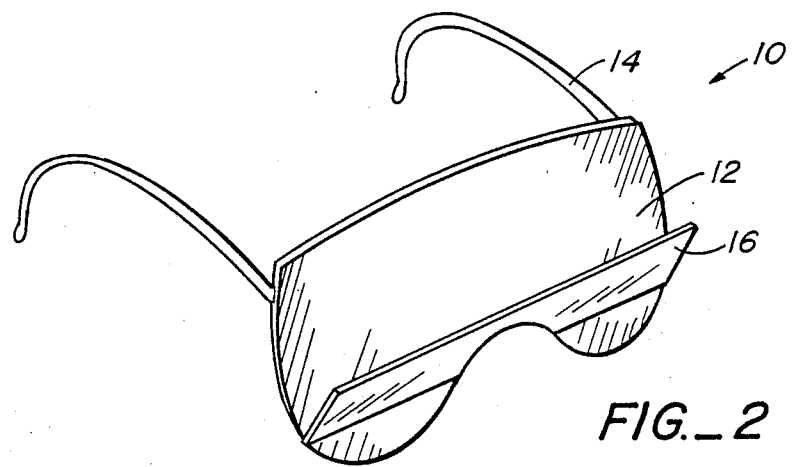
FIG._2
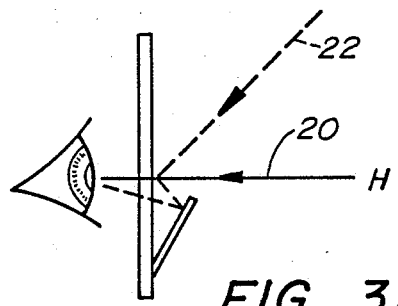
FIG._3A
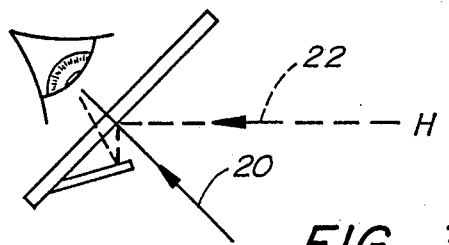
FIG._3B
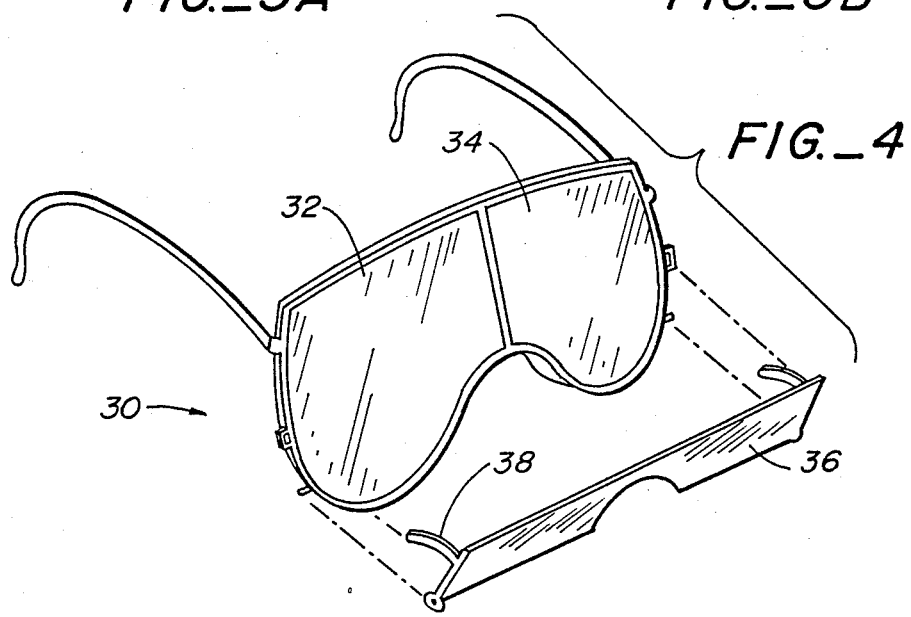
FIG._4
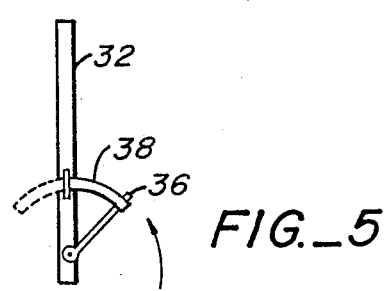
FIG._5
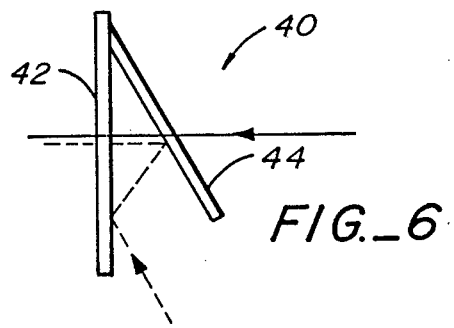
FIG._6

OPTICAL DEVICE

BACKGROUND OF THE INVENTION

1. Field of the Invention

This invention relates generally to optical devices, and more specifically to an improved functional eyewear device for bicyclists and other users.

2. Description of the Prior Art

Bicycling has become an internationally popular sport and recreational pastime, and is well regarded as a form of exercise and cardiovascular activity. Accordingly, a great deal of attention has been paid to the structural design of the bicycles themselves. Most quality bicycles utilize a curved handlebar that can be gripped on either the upper or lower ("drops") portion. Casual, recreational cycling can be performed with the rider gripping only the upper portion of the handlebars, and the body in an upright position. However, most long-distance and competitive cycling requires the rider to ride in a full crouch position, with his hands gripping the "drops" of the handlebars, and his upper body close to the bicycle and parallel to the ground, thereby presenting an efficient, low-drag cross-section to the wind. In this configuration, the bicyclist is able to comfortably view the ground beneath and immediately in front of the bicycle, but he must bend his head and neck back to look towards the road and horizon ahead. Unfortunately, such bending o the head and neck significantly reduces the aerodynamic efficiency of the full crouch position. In addition, this bending is physically uncomfortable for the rider to do, and therefore contributes greatly to rider fatigue.

Some devices have been developed to alleviate this problem. For example, a mirror mounted on the bicycle frame can be aligned to reflect images from the horizon towards the bicyclist's eyes. However, due to the nature of such a single-mirror reflection, the reflected image will appear upside down to the viewer. In addition, the image is limited in its field of view by the orientation of the mounting, and the size and shape of the mirror.

SUMMARY OF THE INVENTION

The optical device of this invention provides a unitary, functional eyewear device that enables the viewer to receive and view both primary (on-axis) and secondary (off-axis) images, merely by looking at those images transmitted through the same or different portions of the device. The optical device includes a primary lens or lenses, of a shape and size to be mounted in a frame and worn as traditional eyewear. This primary lens must have some inherent reflectivity, or may be coated or otherwise treated to act as a partial (see-through) mirror, transmitting some portion of the light reaching it (e.g., fifty percent), and reflecting the remainder.

The optical device further includes a secondary image mirror portion, preferably mounted along one edge of the primary lens so as to capture at least some desired portion of the light reflected from the primary lens. This secondary image mirror acts more a true (opaque) mirror, reflecting some greater portion (e.g., eighty percent) of the light impinging upon it. By proper alignment of this secondary image mirror adjacent the primary lens, some of the light initially reflected by the primary lens is re-reflected back towards the primary lens, where a portion of such light will be transmitted through the primary lens to the viewer's eye. Thus, the viewer is able to perceive two images: the first on-axis (straight ahead) image initially transmitted through the primary lens, and the second off-axis (from above, below, or to the side of the viewer, depending upon the secondary image mirror location) image initially reflected by the primary lens, and then re-reflected by the secondary image mirror back through the primary lens.

Thus, the optical device of this invention is applicable to eyewear for bicyclists, and would enable a user to maintain a full crouch position with his head down and view the ground in front of the bicycle (the primary, on-axis view), as well as the horizon ahead (by the secondary, off-axis view) without moving his head or neck. Alternatively, such a dual-viewing capability is applicable to an aviator's "heads-up" display, where it would enable viewing of instrument panel or other data while maintaining a look-ahead position. Furthermore, standard masks and goggles, such as a skindiver's mask, would achieve an enhanced range and field of vision.

BRIEF DESCRIPTION OF THE DRAWINGS

FIG. 1A is a side elevational view of a bicyclist in an upright (rest) position on a bicycle;

FIG. 1B is a side elevational view of a bicyclist in a down (full crouch) position on a bicycle, without the benefit of the present invention, illustrating the rider's head and neck necessarily bent upwards to enable viewing towards the horizon;

FIG. 2 is a perspective view o a non-adjustable version of an optical device of this invention, designed for secondary viewing of the horizon from a head-down position;

FIGS. 3A and 3B are schematic views illustrating the optical characteristics and light paths of the optical device of FIG. 2;

FIG. 3A is a view of the optical characteristics as worn in an upright position; and FIG. 3B is a view of the optical characteristics as worn in a head-down position;

FIG. 4 is a partially exploded perspective view of an adjustable version of an optical device of this invention having an adjustable secondary image mirror, also designed for secondary viewing of the horizon from a head-down position;

FIG. 5 is a side elevational view of the secondary image mirror adjustment portion of the adjustable optical device of FIG. 4; and FIG. 6 is a side elevational view of an alternate configuration of an optical device of this invention, designed for secondary downward viewing from a head-up position.

DETAILED DESCRIPTION OF A PREFERRED EMBODIMENT

FIG. 1A is a side elevational view of a bicycle rider R in an upright (rest) position on a bicycle B. FIG. 1B is a side elevational view of a rider R in a down (full crouch) position on a bicycle, without the benefit of the present invention, illustrating the rider's head and neck necessarily bent upwards to enable viewing towards the horizon.

FIG. 2 is a perspective view of a non-adjustable version 10 of an optical device of this invention, designed for secondary viewing of the horizon from a head-down position Optical device 10 includes glass or plastic primary lens 12 mounted on a typical eyeglass frame 14. The primary lens may be standard flat glass, may be curved, or may be even a prescription lens. Secondary image mirror 16 is fixedly attached to the lower portion of primary lens 12. It has been determined that an angle of approximately 30 degrees between the primary lens and the secondary image mirror is suitable for many applications, including bicycle riding.

FIGS. 3A and 3B are schematic views illustrating the optical characteristics and light paths of the optical device 10 of FIG. 2. FIG. 3A is a view of the optical characteristics as worn where the head is in an upright position. In such a position, light from the horizon H is transmitted directly to the viewer via primary (on-axis) light path 20, while light from above is transmitted indirectly to the viewer via secondary (off-axis) light path 22. FIG. 3B is a view of the optical characteristics as worn in a head-down position. In this position, light from immediately in front of the viewer is transmitted directly to the viewer via primary (on-axis) light path 20, while light from the horizon H is transmitted indirectly to the viewer via secondary (off-axis) light path 22. In addition, by designing the secondary image mirror to have at least some light transmission (transparency), it is possible for the viewer to look right through both the primary lens and secondary image mirror and thus see two images simultaneously (the horizon and the ground).

FIG. 4 is a partially exploded perspective view of an adjustable version 30 of an optical device of this invention having a pair of primary lenses 32, 34, and an adjustable secondary image mirror 36, also designed for secondary viewing of the horizon from a head-down position. By incorporating an adjustment mechanism 38 to the secondary image mirror, an appropriate secondary (off-axis) image location can be selected. Alternatively, the secondary image mirror 36 could be completely removable, enabling use of the primary lenses as standard glasses. In addition, a separate, stand-alone secondary image mirror could be retrofit to existing glasses to enable the off-axis viewing of this invention.

FIG. 5 is a side elevational view of the secondary image mirror adjustment portion 38 of the adjustable optical device 30 of FIG. 4. The range of motion of adjustment portion 38 may be from zero to thirty degrees relative to the primary lens, or any other desired range.

FIG. 6 is a side elevational view of an alternate configuration 40 of an optical device of this invention, designed for secondary downward viewing from a head-up position. The curvature of the primary lens 42 and secondary image mirror 44 may be different. For example, if the primary lens 42 is flat, the secondary image mirror 44 could be slightly concave towards the viewer, with a focal length approximately equal to the distance from the secondary object (e.g., instrument panel) being viewed. In this way, the primary and secondary objects (e.g., the horizon and the instrument panel, respectively) are both perceived by the viewer at infinity.

While this invention has been described in connection with preferred embodiments thereof, it is obvious that modifications and changes therein may be made by those skilled in the art to which it pertains without departing from the spirit and scope of the invention. For example, while the invention has been specifically described as usable as a piece of eyewear, it could of course be equally applicable to more fixed installations, such as a security window. Accordingly, the scope of this invention is to be limited only by the appended claims.

What is claimed as invention is:

1. An optical device for delivering a first and second image to a viewer, comprising:
   at least one semi-transparent primary lens member for initially transmitting at least some portion of available light to said viewer, and initially reflecting some portion of available light away from said viewer; and
   a generally reflective secondary image mirror member attached to said primary lens portion, said secondary image mirror member aligned to reflect at least some portion of said reflected available light back towards said primary lens.

2. The optical device of claim 1 wherein said primary lens is mounted on an eyeglass frame.

3. The optical device of claim 1 wherein said secondary image mirror is attached to said primary lens by an adjustment mechanism, enabling said secondary image mirror to be positioned in a variety of angles relative to said primary lens.

4. The optical device of claim 3 wherein said angles are between 0 and 30 degrees.

5. The optical device of claim 2 wherein said primary lens includes a base portion, and said secondary image mirror is attached proximate to said base portion so that said secondary image mirror forms an angle of approximately twenty to thirty degrees relative to said primary lens.

6. An optical device for delivering a first and second image to a viewer, comprising a standard pair of eyeglasses, wherein said eyeglasses include at least one semi-transparent primary lens member for initially transmitting at least some portion of available light to said viewer, and initially reflecting some portion of available light away from said viewer, and a generally reflective secondary image mirror member attached to said primary lens portion, said secondary image mirror member aligned to reflect at least some portion of said reflected available light back toward said primary lens and the viewer.

* * * * *